US009646260B1

(12) United States Patent
Tunstall-Pedoe et al.

(10) Patent No.: US 9,646,260 B1
(45) Date of Patent: May 9, 2017

(54) USING EXISTING RELATIONSHIPS IN A KNOWLEDGE BASE TO IDENTIFY TYPES OF KNOWLEDGE FOR ADDITION TO THE KNOWLEDGE BASE

(71) Applicant: Amazon Technologies, Inc., Seattle, WA (US)

(72) Inventors: William Tunstall-Pedoe, Cambridge (GB); Jianhan Zhu, London (GB); Gregory Christopher Doran, Cambridge (GB); Petra Elisabeth Holmes, Cambridgeshire (GB); David Spike Palfrey, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 733 days.

(21) Appl. No.: 13/925,627

(22) Filed: Jun. 24, 2013

(51) Int. Cl.
*G06N 99/00* (2010.01)
*G06F 17/27* (2006.01)
*G06N 5/04* (2006.01)
*G06F 17/30* (2006.01)
*G06N 5/02* (2006.01)

(52) U.S. Cl.
CPC ........... *G06N 99/005* (2013.01); *G06F 17/27* (2013.01); *G06F 17/30* (2013.01); *G06N 5/04* (2013.01); *G06N 5/02* (2013.01)

(58) Field of Classification Search
None
See application file for complete search history.

(56) References Cited

U.S. PATENT DOCUMENTS

| 6,167,370 | A  | * | 12/2000 | Tsourikov | ............. | G06F 17/272 |
|---|---|---|---|---|---|---|
| | | | | | | 704/9 |
| 7,013,308 | B1 | | 3/2006 | Tunstall-Pedoe | | |
| 7,707,160 | B2 | | 4/2010 | Tunstall-Pedoe | | |
| 7,962,326 | B2 | * | 6/2011 | Tsourikov | ........... | G06F 17/2785 |
| | | | | | | 704/9 |
| 8,219,599 | B2 | | 7/2012 | Tunstall-Pedoe | | |
| 8,468,122 | B2 | | 6/2013 | Tunstall-Pedoe | | |
| 8,666,928 | B2 | | 3/2014 | Tunstall-Pedoe | | |
| 8,719,318 | B2 | | 5/2014 | Tunstall-Pedoe | | |

(Continued)

FOREIGN PATENT DOCUMENTS

WO    WO 2007/083079    7/2007

OTHER PUBLICATIONS

Ji et al. Knowledge Base Population: Successful Approaches and Challenges. Proceedings of the 49th Annual Meeting of the Association for Computational Linguistics, pp. 1148-1158, Portland, Oregon, Jun. 19-24, 2011.*

(Continued)

*Primary Examiner* — Stanley K Hill
*Assistant Examiner* — Robert H Bejcek, II
(74) *Attorney, Agent, or Firm* — Weaver Austin Villeneuve & Sampson LLP

(57) ABSTRACT

Techniques are described for adding knowledge to a knowledge base in which alternative information retrieval techniques are used to obtain missing information from an available corpus of documents (e.g., the World Wide Web). Existing relationships in a knowledge base are used to identify entities for which the relationships are not expressed in the knowledge base. The alternative information retrieval techniques are then used to find this information.

15 Claims, 3 Drawing Sheets

(56) References Cited

U.S. PATENT DOCUMENTS

| | | |
|---|---|---|
| 8,838,659 B2 | 9/2014 | Tunstall-Pedoe |
| 9,098,492 B2 | 8/2015 | Tunstall-Pedoe |
| 9,110,882 B2 | 8/2015 | Overell et al. |
| 9,436,681 B1 | 9/2016 | Tunstall-Pedoe et al. |
| 9,466,294 B1 | 10/2016 | Tunstall-Pedoe et al. |
| 2002/0116176 A1* | 8/2002 | Tsourikov ............ G06F 17/2785 704/9 |
| 2006/0242130 A1* | 10/2006 | Sadri ................ G06F 17/30864 |
| 2007/0043708 A1 | 2/2007 | Tunstall-Pedoe |
| 2007/0055656 A1 | 3/2007 | Tunstall-Pedoe |
| 2009/0070284 A1 | 3/2009 | Tunstall-Pedoe |
| 2009/0192968 A1 | 7/2009 | Tunstall-Pedoe |
| 2010/0205167 A1 | 8/2010 | Tunstall-Pedoe |
| 2011/0307435 A1 | 12/2011 | Overell et al. |
| 2012/0036145 A1 | 2/2012 | Tunstall-Pedoe |
| 2013/0253913 A1 | 9/2013 | Tunstall-Pedoe |
| 2013/0254182 A1 | 9/2013 | Tunstall-Pedoe |
| 2013/0254221 A1 | 9/2013 | Tunstall-Pedoe |
| 2013/0262125 A1 | 10/2013 | Tunstall-Pedoe |
| 2013/0275121 A1 | 10/2013 | Tunstall-Pedoe |
| 2014/0351281 A1 | 11/2014 | Tunstall-Pedoe |
| 2015/0356463 A1 | 12/2015 | Overell et al. |

OTHER PUBLICATIONS

U.S. Appl. No. 13/896,078, filed May 16, 2013, Tunstall-Pedoe.
U.S. Appl. No. 13/896,144, filed May 16, 2013, Tunstall-Pedoe.
U.S. Appl. No. 13/896,611, filed May 17, 2013, Tunstall-Pedoe.
U.S. Appl. No. 13/896,857, filed May 17, 2013, Tunstall-Pedoe.
U.S. Appl. No. 13/896,878, filed May 17, 2013, Tunstall-Pedoe.
U.S. Appl. No. 13/899,171, filed May 21, 2013, Tunstall-Pedoe et al.
U.S. Appl. No. 13/925,246, filed Jun. 24, 2013, Holmes.
U.S. Appl. No. 13/943,637, filed Jul. 16, 2013, Tunstall-Pedoe et al.

* cited by examiner

USING EXISTING RELATIONSHIPS IN A KNOWLEDGE BASE TO IDENTIFY TYPES OF KNOWLEDGE FOR ADDITION TO THE KNOWLEDGE BASE

BACKGROUND

One of the ongoing challenges for a knowledge representation system is the accumulation of knowledge represented in the underlying knowledge base. Most systems rely extensively on techniques curated by human experts to add knowledge to their respective knowledge bases. Given the vast and ever-increasing scope of human knowledge, such techniques are clearly inadequate to support a knowledge representation system intended to answer questions on any subject.

DETAILED DESCRIPTION

This disclosure describes techniques for adding knowledge to a knowledge base. According to a particular class of implementations, the knowledge base represents knowledge using facts constructed from objects representing entities (i.e., entity objects) and objects representing relationships (i.e., relation objects) that apply to the entities with which they are associated. As will be appreciated, the knowledge base may include relation objects for which the corresponding relationship is not represented in the knowledge base for one or more of the entity objects. For example, the knowledge base might use the relation object [is a citizen of] to express a fact about the country of citizenship for people represented in the knowledge base. Such a fact might look something like: [tony blair] [is a citizen of] [united kingdom]. Moreover, the relationship represented by this relation object might be expressed for some but not all of the people represented in the knowledge base. One approach to handling this is to employ human operators to add a fact expressing this relationship manually for each person in the world. However, as discussed above, this approach is inefficient and ultimately may be impracticable. Instead, for a given relationship and entity combination not expressed in a knowledge base, implementations described herein employ alternative information retrieval techniques to construct a search query and use it to search an available corpus of documents (e.g., the World Wide Web) for the missing information.

Figure 1:
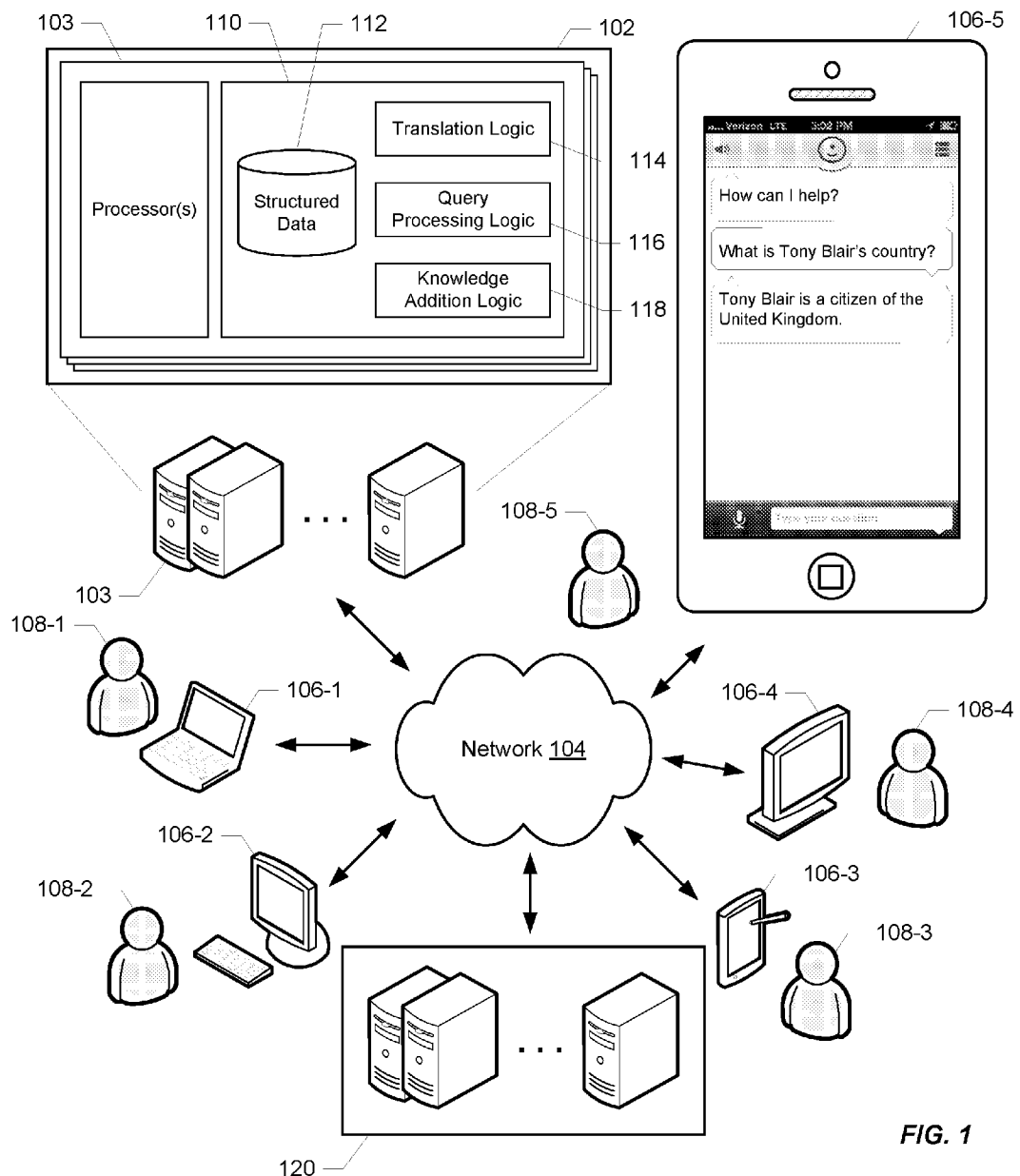
FIG. 1 illustrates an example of a computing environment in which knowledge addition techniques may be employed

FIG. 1 illustrates an example of a computing environment in which users interact with a knowledge representation system 102 via network 104 using a variety of client devices 106 associated with the corresponding users 108. Knowledge representation system 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by service 102. Such devices may include, for example, mobile devices (e.g., cell phones, smart phones, tablets and wearable devices), personal computers (e.g., laptops and desktops), set top boxes (e.g., for cable and satellite systems), smart televisions, gaming consoles, etc. More generally, at least some of the examples described herein contemplate various distributed computing implementations. The term "distributed computing" refers to computing models capable of enabling ubiquitous, convenient, on-demand network access to a shared pool of computing resources (e.g., networks, servers, storage, applications, and services).

It should also be noted that, despite references to particular computing paradigms and software tools, the computer program instructions on which various implementations are based may correspond to any of a wide variety of programming languages, software tools and data formats, and may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

According to a particular class of implementations, knowledge representation system 102 is an information service for filling information needs (e.g., question answering) using a knowledge base 110 that stores information as structured data 112. Knowledge base 110 includes translation logic 114 which translates between natural language and an internal format that is compatible with structured data 112. That is, translation logic 114 translates natural language input (e.g., captured speech or entered text received from device 106-5) to internal queries that are then processed with reference to structured data 112. Translation logic 114 also translates responsive data from structured data 112 and/or its own internal queries requiring further input to natural language for presentation to the user (e.g., on device 106-5). Query processing logic 116 processes internal queries generated by translation logic 114 with reference to structured data 112 to generate responses which may then be translated to natural language by translation logic 114.

Structured data 112 may represent knowledge as a collection of facts; representing the facts with relation objects that express relationships between entities (represented by the entity objects). A fact includes at least one of these entity-relationship-entity "triples" and may include other information, e.g., temporal information indicating when the fact is (or was) valid, contextual information indicating a context in which the fact is true, etc. It should also be noted that structured data 112 might represent the relationship between entities without using a relation object. That is, the relationship may be represented using other types of data that explicitly or implicitly represent the connection between two entities (i.e., relation data). For example, the relationship between two entities might be represented by connections between database table entries. Other suitable ways of representing such relationships will be apparent to those of skill in the art.

According to a particular class of implementations, the knowledge representation system in which knowledge addition as described herein is supported (e.g., system 102 of FIG. 1) is implemented as described, for example, in U.S. Patent Publication No. 2007/0043708 entitled Knowledge Storage and Retrieval System and Method, and U.S. Patent Publication No. 2007/0055656 entitled Knowledge Repository, the entire disclosure of each of which is incorporated herein by reference for all purposes. However, it will be understood that the various functionalities described herein are much more widely applicable. That is, the techniques described herein may be used to support knowledge addition in a broad range of knowledge representation systems. The scope of the invention should therefore not be limited to the examples described herein.

According to a particular class of implementations, knowledge base 110 includes knowledge addition logic 118 which is configured to identify information missing from the knowledge base 110, use information retrieval techniques to identify relevant documents, and extract knowledge from the documents for addition to the knowledge base. According to a specific implementation, knowledge addition logic 118 is configured to identify specific knowledge base relationships for which knowledge addition is needed or desirable, construct search queries for identifying responsive documents likely to include the desired information, extract the desired information from the search results, and add new knowledge generated from the extracted information to structured data 112.

According to various implementations, knowledge addition logic may employ a wide variety of information retrieval techniques to identify suitable documents for extracting such information. For example, knowledge addition logic may exploit search results from Internet search engines such as Google® (provided by Google® Inc. of Mountain View, Calif.) or Bing® (provided by Microsoft® Corporation of Redmond, Wash.). Alternatively (or in addition), knowledge addition logic might search a purpose-built corpus of documents indexed and maintained in conjunction with the knowledge representation system. Such an approach may be advantageous in some respects as it may, for example, enable more sophisticated pattern matching. Another alternative might be an enterprise search engine (e.g., as provided by Autonomy® Corporation of Cambridge, UK). The scope of the search or document corpus might also be restricted in other ways. For example, the search could be restricted to a particular domain (.com, .org, etc.), or web site (e.g., Wikipedia®). The range of alternatives is generically represented in FIG. 1 by search service 120.

Figure 2:
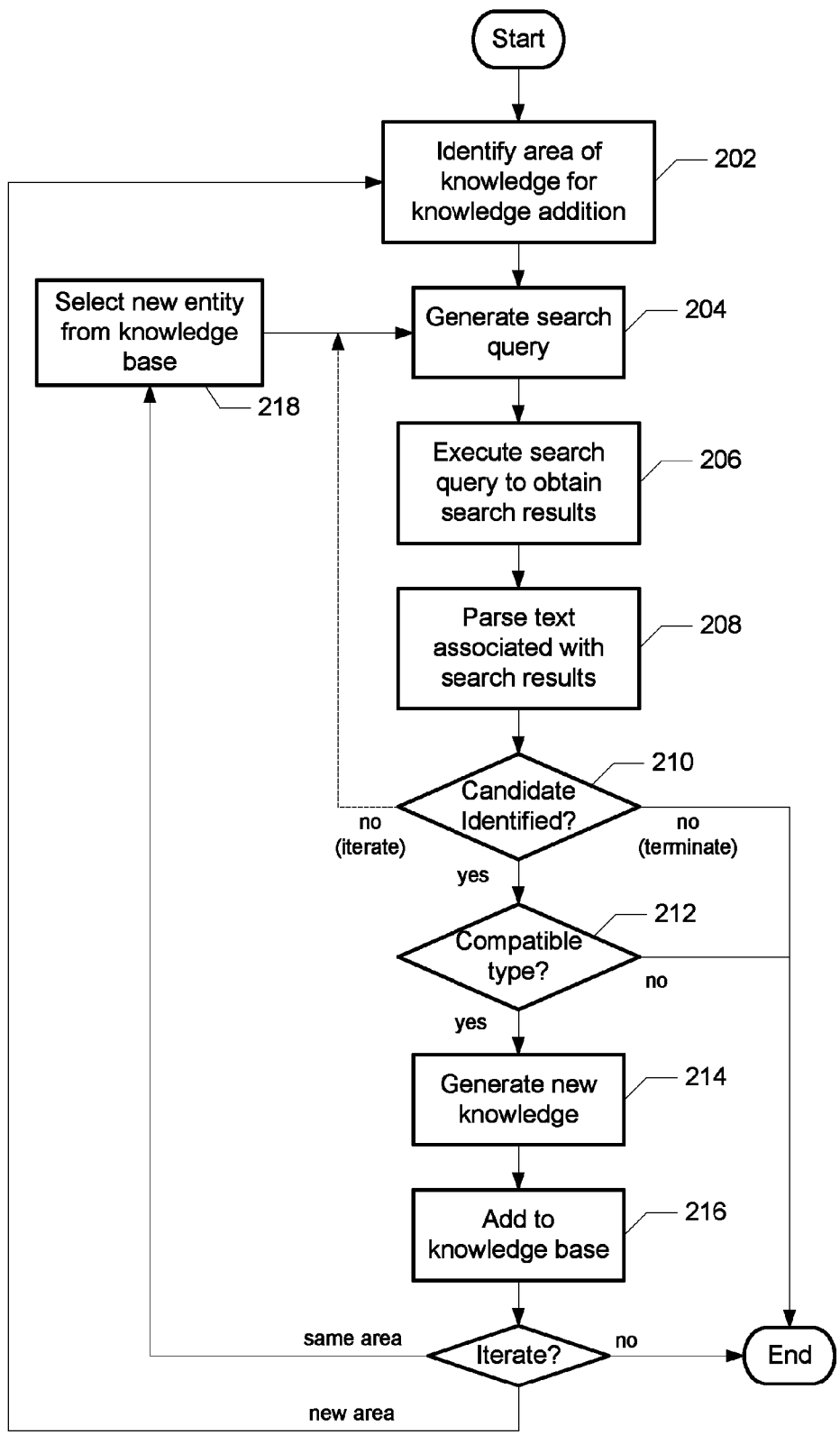
FIG. 2 is a flow diagram illustrating an example of a technique for adding knowledge to a knowledge base.

An example of the operation of a specific implementation of knowledge addition logic will now be described with reference to the flow diagram of FIG. 2. An area of knowledge is identified for addition to an underlying knowledge base (202). The manner in which the area of knowledge is identified may vary considerably. For example, the area of knowledge might correspond to a relationship represented in the knowledge base by a particular relation object, e.g., [is the biological mother of] or [is the nationality of]. In one approach, the area of knowledge might be selected naively, e.g., a relation object (or a succession of relation objects) could be selected at random. Alternatively, the area of knowledge may be identified with a higher degree of selectivity or intelligence. For example, a human expert could guide the selection of one or more appropriate relation objects from the knowledge base, e.g., relation objects for which knowledge extraction is likely to be accurate and reliable, or relation objects having specific characteristics. In another example, identification of a suitable area of knowledge may be guided, at least in part, by an automated process, e.g., a process which identifies relation objects having particular characteristics and/or evaluates the likelihood that knowledge extraction is likely to be accurate and reliable for particular relation objects. Examples of possible criteria are discussed below.

One example of a criterion for a given area of knowledge that may enhance accuracy and reliability is where the corresponding relation object in the knowledge base has a unique value for the left or right entity object for a given entity object on the opposite side of the relation object. For example, the relation object [is the biological mother of] is left unique for any value on the right hand side, i.e., every human has one and only one biological mother. However, it should be understood that left or right uniqueness is not a necessary criterion.

Determining the side of a relation object most suitable for generating new facts may be based on which side of the relation object is unique or more restricted than the other side. For example, [is the nationality of] is generally left unique. Therefore, instances of classes for the right side might be traversed in order to find the corresponding left side objects. By contrast, for the relation object representing the relationship between an actor and a production, i.e., [is a star in], facts could be generated for both the left and right side objects. For the relation object [is a graduate of], it might be more suitable to generate facts by finding objects to complete the right side, since the right side is more restricted in the sense that there are typically many more graduates of a particular school than the number of schools a person could have graduated from.

Where neither side of a relation is unique, existing facts in the knowledge base can guide a decision as to which side of the relation is more appropriate for fact generation. For example, the existing facts can be evaluated to determine the average number of objects on each side of the relation. The median might be the best average to use since a typical scenario is that the relation is only populated for a handful of objects which would give a mean of close to zero.

A variety of other types of input may be used to guide the selection of a particular area of knowledge. For example, user requests for information (e.g., natural language questions) that are not resolvable from the knowledge base may be used to identify particular knowledge areas for which knowledge addition is desirable. Such an approach could enable the filling of a user's information need in real time even where the requested information is not currently represented in the knowledge base. Alternatively or in addition, the system could track user requests for information over time to identify information areas for which the frequency of the requests exceeds some threshold. As yet another alternative, for systems that employ templates to translate natural language questions to machine-readable queries (e.g., for processing by a knowledge base), such templates may be used to generate questions for the purpose of identifying entities for which a particular relationship is not currently known.

For a knowledge base in which knowledge is represented with triples comprising entity and relation objects, specific relation objects (and possibly specific entity objects) corresponding to particular areas of knowledge could be identified based on the input from the user(s). For example, where the user input is in the form of a natural language question, relation and/or entity objects may be identified through recognition of corresponding keywords or phrases in the question. This might occur, for example, during translation of the natural language input to a format that is compatible with the format of the data in the knowledge base. As should be appreciated, a wide range of variations are contemplated regarding the manner in which the area of knowledge is selected or identified.

Referring again to FIG. 2, a search query is generated (204) for identifying relevant documents from which information corresponding to the identified area of knowledge may be derived. The manner in which the search query is generated may vary considerably and may depend, at least in part, on the manner in which the area of knowledge was identified. For example, where the area of information was identified with reference to user input, at least a portion of the search query may be derived from the user input itself, e.g., keywords or phrases in natural language input. Where the area of information corresponds to a relation object in the underlying knowledge base (however identified), at least a portion of the search query may be derived from the relation object or associated data. For example, if the relation object is [is the mayor of], the keyword "mayor" may be included in the search query. Additionally or alternatively, if the relation object has any associated text strings in the knowledge base (e.g., lexical natural language expressions in a particular language), text from such strings may be used to construct the search query. If there are multiple strings or terms multiple queries might be generated and/or multiple keywords corresponding to the multiple strings or terms could be combined (e.g., using Boolean operators and/or a variety of other search operators) in a single query.

According to implementations, in which the area of information corresponds to a relation object, an entity object is selected or identified for generation of the search query. Again, the manner in which the entity object is selected or identified depends on the manner in which the area of information was identified and the particular use case. For example, if the area of information was identified as part of an attempt to answer a user's question "Who discovered radium?" the entity object in the knowledge base corresponding to radioactive element radium might be identified during the translation of the user's natural language question. The entity object for radium or a lexical string associated with the entity object could then be the source for text to be included in the search query, e.g., the text "radium" might be included in the search query. Together with the text derived from the relation object, the resulting search query might be "discovered radium." It should be noted that this example assumes that the identity of the discoverer of radium, i.e., Marie Curie, is not represented in the knowledge base because the question would otherwise be answered using the knowledge base. For implementations employing a knowledge base that represents knowledge using object triples as described above, the absence of this information can be represented by the triple a [is the discoverer of] [radium], where a is a variable representing the missing entity object corresponding to the discoverer of radium.

If, on the other hand, the use case relates to the addition of an entire class of knowledge to the knowledge base, an iterative process might be conducted in which a sequence of search queries would be generated for each of a plurality of appropriately selected entities. In keeping with the current example, the entity objects corresponding to all elements in the periodic table would be sequentially selected to generate corresponding search queries to identify relevant documents from which the missing information might be obtained, i.e., the right-hand object in the triple above would have new objects substituted for each iteration to attempt to identify the corresponding value of the variable a. In cases where the right-hand object might correspond to entities of different classes and/or sub-classes (e.g., geographic entities likely to have a mayor), an ontology associated with the knowledge base might be referenced to identify suitable candidates for substitution.

In some cases, the search query might be a simple combination of keywords derived, for example, from a user's natural language question, e.g., a concatenation of a text string corresponding to a relation object and a text string corresponding to an entity object. However, it should be noted that additional information might be included to improve the likelihood that the most relevant documents are identified. For example, if the knowledge base has text strings associated with an entity object that provide other representations of an entity, such text strings might be included in addition to or in place of other strings, e.g., "New York" might be represented by "NYC," "the Big Apple," or "New York City, N.Y., United States."

There are many different formulations of a query that reflect the same information need. In some cases, the best query matches how the relation is usually expressed in natural language. For example, the phrase "nationality of tony blair" including the quotation marks does not produce a good set of relevant documents because the query is too strict, i.e., that exact phrase is unlikely to show up in a document. However, a search for nationality "tony blair" relaxes the matching criteria but returns more relevant documents.

Knowledge representation systems implemented as described in U.S. Patent Publications No. 2007/0043708 and No. 2007/0055656 include facts relating strings of text to relation objects using other relation objects such as, for example, [is a left possessive form of]. Such a relation object ties the string "nationality" to [is the nationality of]. In another example, the relation object [is the canonical left possessive form of] generally denotes the best text representation. According to such implementations, a guideline for query generation could be to use strict string matching as much as possible, and gradually relax the requirement as needed to allow more matched documents. On the other hand, excessive relaxation of the requirement could result in the introduction of noise, leading to the generation of unreliable facts. For example, the query "denzel washington" starred leads to more noise in search results than "denzel washington starred in". According to some implementations, an optimal query can be found by automatic training. For example, the precision and recall of a query may be computed by comparing the results to existing facts in the knowledge base, and the query with the highest precision and a reasonably high recall may be selected.

It should be noted that the selection or identification of text for inclusion in a search query, the selection or identification of relation and/or entity objects, and the sequence in which entity objects are selected or identified for successive search queries may be done manually with input from humans, by an automated process, or by a combination of both. More generally, and depending on the implementation, generation of the search quer(ies) may be done with or without human intervention.

Referring again to FIG. 2, the search query is submitted to and/or executed by a search engine to identify responsive documents (206). As mentioned above, the nature of the search engine and the corpus of documents over which the search is conducted may vary considerably with different implementations. For example, the search engine may be a general Internet search engine with the corpus of documents being all documents that are indexed and searchable on the World Wide Web. Alternatively, the search engine may be a more focused or proprietary search engine that searches a purpose-built corpus of documents. As mentioned above, the wide range of possibilities are represented in FIG. 1 by search services 120.

Text associated with at least some of the documents responsive to the search query (e.g., the top 10 or 15 most relevant) is parsed to identify information that is likely to be responsive to the search query for possible inclusion in the knowledge base (208). According to a particular class of implementations, the search engine identifies fragments of text in the responsive documents that are in proximity to the keywords or phrases of the search query. For example, for implementations employing an Internet search engine these fragments might correspond to the snippets of text typically found in search results. The identified fragments are examined for recurring words and phrases which are assigned relevance scores.

Search engines like Google® or Bing® return a ranked list of search results. Each search result includes a title, URL, and one or more snippets of a page. It may often be sufficient to use the snippet for fact extraction rather than downloading the original page. From the search snippets, all possible entities which could be potential answers are identified. The pattern for matching the answers may be specified as a regular expression, e.g., for dates, person names, etc.

According to a particular implementation, a scoring heuristic uses a combination of the proximity of words and phrases to the keywords of the search query, and the number of occurrences to generate the relevance scores, e.g., a weighted sum across all search snippets in which the weight is based on rank position of the snippet, and proximity of the entity to query terms. And only where there is a single recurring word or phrase that has a significantly higher relevance score than other recurring words or phrases, and only if the relevance score for that word or phrase exceeds some tunable threshold, will that word or phrase be designated as a candidate for inclusion in the knowledge base (210). Otherwise, the process may terminate. As will be understood by those of skill in the art, the degree to which a relevance score of a particular candidate should exceed those of other words and phrases, and the level of the relevance threshold may be adjusted to achieve an desired level of reliability for a given implementation, as well as for a given area of knowledge within any particular implementation. It should also be understood that the process may be iterated for a given relation/entity combination by making adjustments to the manner in which the search query is generated (as represented by the dashed arrow leading back to 204. More about the nature of possible adjustments will be described below with reference to FIG. 3.

It should also be understood that implementations are contemplated in which one or more recurring words or phrases might be retained even if none are suitable as a candidate for generation of a fact in the current iteration. For example, such recurring words or phrases might be retained for evaluation for knowledge generation in the future if they correspond to entities not represented in the knowledge base.

If a candidate word or phrase is identified (210), and it is compatible with the type of answer (e.g., object type) expected (212), new knowledge (e.g., a fact triple) may be generated using the candidate word or phrase (214), and the new knowledge may be added to the knowledge base (216).

Returning to the example of the triple a [is the discoverer of] [radium], the expected object type for suitable replacements for the variable a would be human beings. Thus, if the candidate word or phrase does not correspond to a human being, it would be rejected. On the other hand, if the candidate word or phrase does correspond to a human being a new fact would be generated in which the variable a is replaced with an entity object representing that human being. This new entity object could be retrieved from the knowledge base if already present, or derived from the candidate word or phrase itself, e.g., resulting in the triple [Marie Curie] [is the discoverer of] [radium]. Other suitable filtering mechanisms might be used to reject candidate words or phrases. For example, if generation of a fact using the candidate word or phrase would result in a contradiction with existing knowledge in the knowledge base, e.g., a fact that indicates that Marie Curie is a fictional character, the candidate word or phrase could be rejected. As will be discussed below with reference to FIG. 3, a variety of additional or alternative evaluations of new knowledge may be employed before a decision is made to include the new knowledge in the knowledge base; either on a permanent or provisional basis.

In some cases, it may be necessary to consider whether the relation object represents a transient relationship. If so, the fact may need a temporal partner to indicate during what time period or at what point in time the fact is true. For example, the temporal data about when a fact is true may be represented with one or more further facts, e.g.:

[fact.2143@evi.com]: [barack hussein obama] [is the president of] [united states]

[fact.2144@evi.com]: [fact.2143@evi.com] [applies for timeperiod] [timeperiod: [timepoint: ["2009/01/20"]]; [iafter]]

[fact.2144@evi.com] makes an assertion about [fact 0.2143@evi.com] namely that Barack Obama has been the President of the United States from the 20 Jan. 2009 to the indefinite future. Such temporal partners may be derived from the search results. For example, information such as when a Web page was produced, or date information in proximity to the fact in the search results might be used.

Where the process for identifying new knowledge is intended to identify only one new fact, e.g., in the case of real-time question answering, the process may terminate. On the other hand, if the process is intended to add an entire class of new facts for the identified area of knowledge, the process may be iterated (218) for successive entities in the knowledge base by generating additional search queries designed to identify documents informing the currently selected area of knowledge for each successive entity. So, for example, where the area of knowledge is represented by the relation object [is the mayor of], each city, town, village, or municipality having a corresponding entity object in the knowledge base could be selected for possible generation of facts for addition to the knowledge base. In addition, the overall knowledge addition process may be iterated for new areas of knowledge (202) for addition to the knowledge base.

Figure 3:
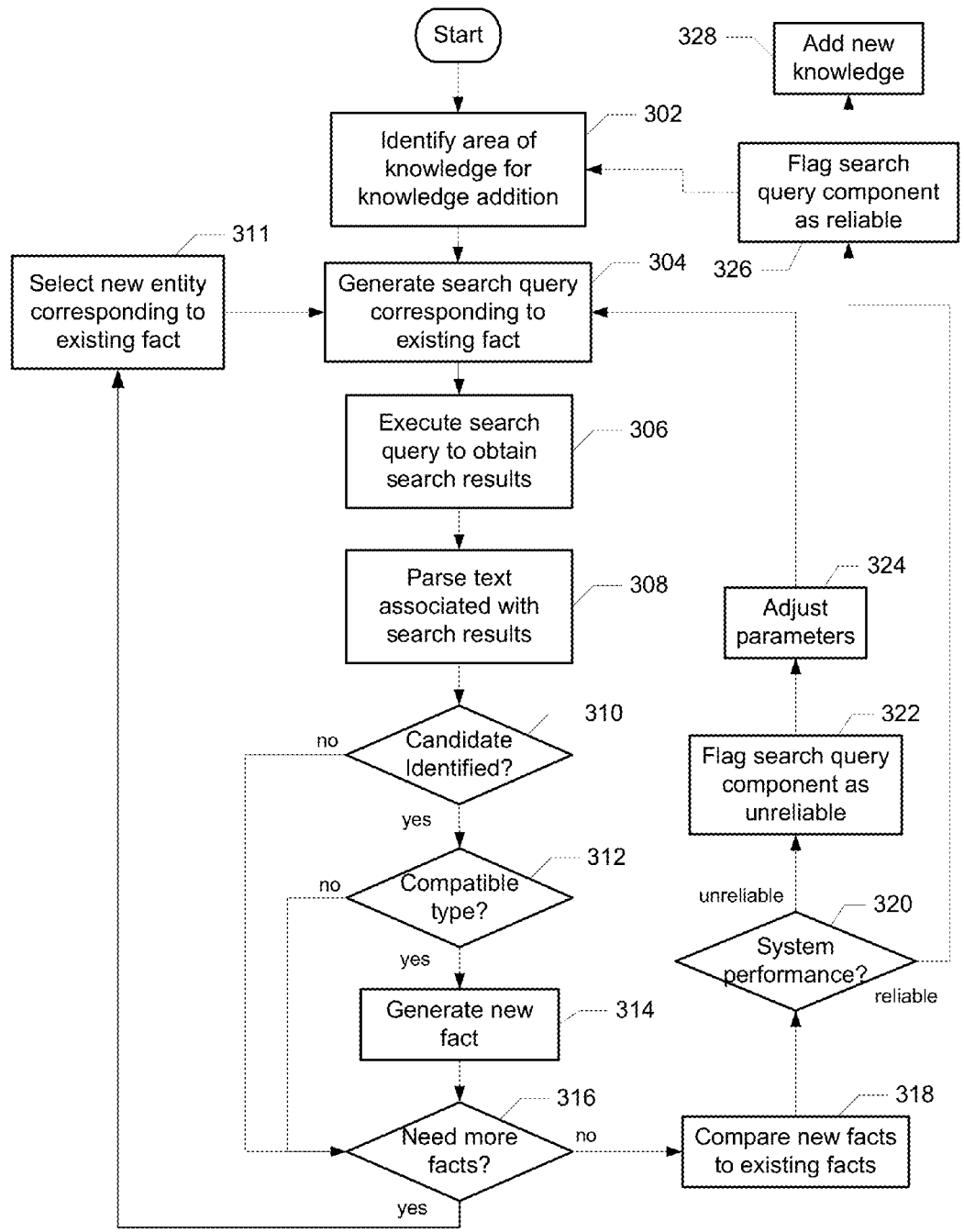
FIG. 3 is a flow diagram illustrating an example of a technique for identifying and/or evaluating areas of knowledge for addition to a knowledge base.

FIG. 3 illustrates an example of a technique for identifying areas of knowledge that are good candidates for addition to a knowledge base using the techniques described herein and/or evaluating the reliability and accuracy of the techniques themselves to improve system performance. The depicted example may be used in conjunction with or independent of the technique described above with reference to FIG. 2. The depicted example will also assume a knowledge base that employs triples to represent knowledge as discussed above. However, those of skill in the art will understand how to generalize at least portions of the depicted technique to other forms of knowledge representation.

An area of knowledge is identified for addition to the knowledge base (302). The manner in which the area of knowledge is identified may vary considerably and may use at least some of the criteria discussed above with reference to 202 of FIG. 2. However, in addition to those criteria, the area of knowledge may be selected because the knowledge base already includes independently verified knowledge for the selected area of knowledge that may be used to evaluate performance.

A search query is constructed for an entity represented in the knowledge base for which a reliable fact for the entity object and relation object combination already exists in the knowledge base (304). The search query is submitted to and/or executed by a search engine to identify responsive documents (306). Text associated with at least some of the responsive documents is parsed to identify information that is likely to be responsive to the search query (308). Where there is a single word or phrase that has a significantly higher relevance score than other recurring words or phrases, and only if the relevance score for that word or phrase exceeds some tunable threshold, will that word or phrase be designated as a candidate for fact generation (310). Otherwise, the process continues and a new search query is generated for the next entity object for which a reliable fact exists in the knowledge base (311). If a candidate word or phrase is identified (310), and it is compatible with the type of answer (e.g., object type) expected (312), a fact triple is generated using the candidate word or phrase (314). The generation and execution of search queries, parsing of responsive document text, scoring of words and phrases, and generation of facts may be done as discussed above with reference to FIG. 2.

When the process has iterated through a sufficient number of the suitable entity objects in the knowledge base (316), the resulting new knowledge is compared to the existing knowledge (318). What constitutes a sufficient number of new facts being generated may vary and may be determined or selected in a variety of ways. For example, the number could be selected by a human operator that initiated the process, may be a pre-programmed number, or might correspond to the number of existing facts in the knowledge base for the currently selected area of knowledge. The comparison between the newly generated facts and the existing facts may also be done in a variety of ways. For example, the new entity object replacing the variable a for each new fact can be compared for identity with the corresponding object for the existing fact. Alternatively, a knowledge base query could be generated from each new fact and processed by the knowledge base to get a "true" or "false" determination. As yet another alternative, the human operator could manually compare the new facts against the knowledge base. According to some implementations, automated mechanisms may be employed to evaluate new knowledge. For example, assessing the accuracy of a new fact may include determining whether it is contradicted by an existing fact in the knowledge base. This might be done, for example, by constructing a query which requires a "yes" or "no" answer. In the example relating to the discoverer of radium, such a query might be represented in natural language as "Is Marie Curie the discoverer of radium?" The correct response based on existing knowledge (in this case "yes") may be used to determine whether the new knowledge from which the query was generated is correct. Further information regarding suitable assessment tools that may be used to evaluate the accuracy and/or reliability of knowledge generated as described herein are described in U.S. Patent Publication No. 2007/0055656 incorporated herein by reference above.

If the system performance, e.g., accuracy and/or reliability of the new facts, is determined to be unacceptably low (320), the component of the search queries derived from the relation object is flagged as unreliable (322), and a variety of parameters may be adjusted (324) to generate different search queries and another set of new facts for the selected area of knowledge to determine whether system performance may be improved. The measure of accuracy and/or reliability may vary considerably for different applications and use cases. For example, for processes that are relatively automated, the accuracy and reliability might need to be very high, whereas for human curated processes, lower accuracy and reliability could be tolerated. Thus, this measure will vary for different implementations. If, on the other hand, system performance is determined to be acceptable (320), the component of the search queries derived from the relation object is flagged as reliable (326) for use in generating search queries for addition of new knowledge (328), i.e., knowledge in the selected area of knowledge for entities that is not currently represented in the knowledge base. This might be accomplished, for example, using the technique described above with reference to FIG. 2. The process may then be repeated for new areas of knowledge as indicated by the dashed arrow to 302.

The parameters that might be adjusted to modify system performance for successive iterations may vary considerably. For example, the contributions to the search query corresponding to the relation object and the various entity objects may be modified or replaced with other alternatives. Additional keywords or phrases derived from the relation object, the entity objects, or other objects with which each is associated may be added to the search queries. Some keywords or phrases may be placed in quotation marks to focus the search, or the use of quotation marks can be reduced or eliminated if the scope of the search is too narrow. Other search parameters might be adjusted as well, e.g., the proximity of text corresponding to the entity and relation objects in responsive documents. Those of skill in the art will appreciate a variety of other ways in which search parameters and query generation may be modified to modify or enhance system performance.

As will be understood by with reference to the foregoing description, techniques implemented as described herein may be employed to efficiently generate knowledge for addition to a knowledge base. In some cases, the added knowledge may benefit from being derived from multiple sources, thus improving confidence that that added knowledge is accurate.

Implementations are also contemplated in which features or capabilities of the underlying knowledge base may be leverage to enhance and/or optimize the techniques described herein. For example, existing knowledge in the knowledge base may be used to select or filter the words or phrases that are possible candidates for inclusion in the knowledge base. Suppose the area of knowledge for which facts are being generated is all the movies directed by James Cameron. This might result in generation of the search query 'movie directed "james Cameron"'. The search results include many snippets containing the word "Titanic." To resolve this term to a useful object in the knowledge base, the following query may be run:

Query x
["Titanic"] [can denote] x
Execution of the query returns two very popular objects, i.e., one representing Titanic the ship and one representing Titanic the film. In this example, the object representing the ship can be rejected because the ontology of the knowledge base makes it clear that ships don't have film directors, e.g., that an object representing a ship is not appropriate as the left hand object in a fact including the relation object [is directed by].

In another example involving the relation object [is directed by], a user might ask "Which Seinfeld episode was directed by Steven Spielberg?" This might then be translated to an internal query for processing by the knowledge base as follows:
Query x
x [is an episode of] [seinfeld]
x [is directed by] [steven spielberg]
Failure to answer the query from the knowledge base (e.g., because that knowledge is not represented) results in the search query 'seinfeld episode directed by steven speilberg' using the techniques described above. Suppose that the promising search results include some variant of the phrase "series 1 episode 7" and include snippets containing "Steven Spielberg" and "Seinfeld" to make them look convincing.

As discussed above, these search results may be parsed in an attempt to identify an object in the knowledge base. This might be done by naively running the internal query:
Query ep
["series 1 episode 7"] [can denote] ep
However, such a query is likely to generate many results for episodes of a number of different TV shows, the vast majority of which would not be an appropriate match for the expressed information need. And if the returned objects are ordered by popularity (a common way to pick the most relevant result in many cases), the object [series 1 episode 7 of friends tv show] for the TV show "Friends" might be identified as the most popular.

Obviously, because we are trying to identify a particular episode of "Seinfeld," we do not want to assert the fact: [series 1 episode 7 of friends tv show] [is directed by] [steven spielberg]. So instead, a better query may be formulated by using part of the original query that came from the user question, e.g.:
Query ep
["series 1 episode 7"] [can denote] ep
Ep [is an episode of] [seinfeld]
This only gives one result, the correct one, which is [series 1 episode 7 of seinfeld tv show]. An alternative approach could be to generate the results from the first line of the original query (in this example: x [is an episode of] [seinfeld]) and for each one, check if it can be denoted by the string "series 1 episode 7." Other variations will be apparent to those of skill in the art.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity.

Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   accessing a knowledge base stored on one or more computing devices in a computing network, the knowledge base including a plurality of entity objects and a plurality of facts, each fact corresponding to at least one of a plurality of fact types;
   identifying first relation data in the knowledge base corresponding to a plurality of facts of a first fact type, wherein for each fact of the first fact type in the knowledge base the first relation data express a relationship for a pair of the entity objects, and wherein for each fact of the first fact type in the knowledge base the first relation data require that one of the pair of entity objects has a unique value for a given value of the other of the pair of entity objects;
   identifying an entity object class based on which of the pair of entity objects corresponding to a first fact of the first fact type is unique;
   identifying a first subset of the entity objects that correspond to the entity object class and for which corresponding facts of the first fact type are not represented in the knowledge base;
   responsive to identifying the first subset of entity objects, selecting a first entity object from the first subset of entity objects for generation of a new fact of the first fact type;
   generating a search engine query using the first relation data and the first entity object;
   searching a set of documents using the search engine query to generate search results;
   parsing the search results to identify first information representing the first relation data for the entity corresponding to the first entity object;
   generating the new fact for addition to the knowledge base using the first information, the first entity object, and the first relation data;
   adding the new fact to the knowledge base; and
   repeating the selecting, generating, searching, parsing, generating, and adding for each of the entity objects included in the first subset of the entity objects.

2. The method of claim 1, wherein identifying the first relation data includes:
   receiving natural language input from a user;
   generating a knowledge base query for use with the knowledge base using the natural language input, the knowledge base query identifying the first entity object and the first relation data; and
   determining that a fact corresponding to the first relation data is not expressed in the knowledge base for the first entity object by processing the knowledge base query with reference to the knowledge base.

3. The method of claim 1, further comprising:
   identifying a second subset of the entity objects having corresponding facts in the knowledge base corresponding to the first relation data;
   generating search results from the set of documents corresponding to each of the second subset of the entity objects; and
   generating second facts for each of the second subset of the entity objects using the search results; and comparing the facts in the knowledge base corresponding to the second subset of the entity objects with the second facts.

4. The method of claim 1, wherein identifying the first relation data includes tracking unanswered user queries, and identifying the first relation data from the unanswered user queries.

5. The method of claim 1, wherein generating the search engine query comprises:
generating an initial query with reference to the first relation data and the first entity object;
searching the set of documents using the initial query to generate preliminary search results; and
refining the initial query to generate the search engine query using the preliminary search results.

6. The method of claim 1, wherein generating the search engine query comprises:
retrieving one or more text strings associated with one or both of the first relation data and the first entity object in the knowledge base; and
generating the search engine query using the one or more text strings.

7. The method of claim 1, wherein parsing the search results to identify the first information comprises identifying one or more first text strings in the search results associated with one or more second text strings in the search results, the one or more second text strings representing the first relation data for the entity corresponding to the first entity object, the one or more first text strings corresponding to an entity class associated with the first relation data in the knowledge base.

8. A computing system, comprising:
one or more data stores in a computing network, the one or more data stores having a knowledge base stored therein including a plurality of entity objects and a plurality of facts, each fact corresponding to at least one of a plurality of fact types; and
one or more computing device in the computing network configured to:
identify first relation data in the knowledge base corresponding to a plurality of facts of a first fact type, wherein for each fact of the first fact type in the knowledge base the first relation data express a relationship for a pair of the entity objects, and wherein for each fact of the first fact type in the knowledge base the first relation data require that one of the pair of entity objects has a unique value for a given value of the other of the pair of entity objects;
identify an entity object class based on which of the pair of entity objects corresponding to a first fact of the first fact type is unique;
identify a first subset of the entity objects that correspond to the entity object class and for which corresponding facts of the first fact type are not represented in the knowledge base;
responsive to identification of the first subset of entity objects, select a first entity object from the first subset of entity objects for generation of a new fact of the first fact type;
generate a search engine query using the first relation data and the first entity object;
search a set of documents using the search engine query to generate search results;
parse the search results to identify first information representing the first relation data for the entity corresponding to the first entity object;
generate the new fact for addition to the knowledge base using the first information, the first entity object, and the first relation data;
add the new fact to the knowledge base; and
repeat the selecting, generating, searching, parsing, generating, and adding for each of the entity objects included in the first subset of the entity objects.

9. The computing system of claim 8, wherein the one or more computing devices are configured to identify the first relation data by:
receiving natural language input from a user;
generating a knowledge base query for use with the knowledge base using the natural language input, the knowledge base query identifying the first entity object and the first relation data; and
determining that a fact corresponding to the first relation data is not expressed in the knowledge base for the first entity object by processing the knowledge base query with reference to the knowledge base.

10. The computing system of claim 8, wherein the one or more computing devices are further configured to:
identify a second subset of the entity objects having corresponding facts in the knowledge base corresponding to the first relation data;
generate search results from the set of documents corresponding to each of the second subset of the entity objects; and
generate second facts for each of the second subset of the entity objects using the search results; and
compare the facts in the knowledge base corresponding to the second subset of the entity objects with the second facts.

11. The computing system of claim 8, wherein the one or more computing devices are configured to identify the first relation data by tracking unanswered user queries, and identifying the first relation data from the unanswered user queries.

12. The computing system of claim 8, wherein the one or more computing devices are configured to generate the search engine query by:
generating an initial query with reference to the first relation data and the first entity object;
searching the set of documents using the initial query to generate preliminary search results; and
refining the initial query to generate the search engine query using the preliminary search results.

13. The computing system of claim 8, wherein the one or more computing devices are configured to generate the search engine query by:
retrieving one or more text strings associated with one or both of the first relation data and the first entity object in the knowledge base; and
generating the search engine query using the one or more text strings.

14. The computing system of claim 8, wherein the one or more computing devices are configured to parse the search results to identify the first information by identifying one or more first text strings in the search results associated with one or more second text strings in the search results, the one or more second text strings representing the first relation data for the entity corresponding to the first entity object, the one or more first text strings corresponding to an entity class associated with the first relation data in the knowledge base.

15. A computer program product for adding knowledge to a knowledge base in a computing network, the knowledge base including a plurality of entity objects and a plurality of facts, each fact corresponding to at least one of a plurality of fact types, the computer program product comprising one or more non-transitory computer-readable media having computer program instructions stored therein, the computer program instructions being configured such that, when executed, the computer program instructions cause one or more computing devices to:

identify first relation data in the knowledge base corresponding to a plurality of facts of a first fact type, wherein for each fact of the first fact type in the knowledge base the first relation data express a relationship for a pair of the entity objects, and wherein for each fact of the first fact type in the knowledge base the first relation data require that one of the pair of entity objects has a unique value for a given value of the other of the pair of entity objects;

identify an entity object class based on which of the pair of entity objects corresponding to a first fact of the first fact type is unique;

identify a first subset of the entity objects that correspond to the entity object class and for which corresponding facts of the first fact type are not represented in the knowledge base;

responsive to identification of the first subset of entity objects, select a first entity object from the first subset of entity objects for generation of a new fact of the first fact type;

generate a search engine query using the first relation data and the first entity object;

search a set of documents using the search engine query to generate search results;

parse the search results to identify first information representing the first relation data for the entity corresponding to the first entity object;

generate the new fact for addition to the knowledge base using the first information, the first entity object, and the first relation data;

add the new fact to the knowledge base; and repeat the selecting, generating, searching, parsing, generating, and adding for each of the entity objects included in the first subset of the entity objects.

* * * * *